US012579723B1

(12) United States Patent
Vemuri et al.

(10) Patent No.: US 12,579,723 B1
(45) Date of Patent: Mar. 17, 2026

(54) UNIFIED ANIMATION API

(71) Applicant: Apple Inc., Cupertino, CA (US)

(72) Inventors: Naveen K. Vemuri, Mountain View, CA (US); David A. Yen, Palo Alto, CA (US); Joshua J. Taylor, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/852,068

(22) Filed: Jun. 28, 2022

Related U.S. Application Data

(60) Provisional application No. 63/246,645, filed on Sep. 21, 2021.

(51) Int. Cl.
*G06T 13/20* (2011.01)
*G06T 13/80* (2011.01)
*G06T 19/00* (2011.01)

(52) U.S. Cl.
CPC .............. *G06T 13/20* (2013.01); *G06T 13/80* (2013.01); *G06T 19/00* (2013.01)

(58) Field of Classification Search
CPC .......... G06T 13/20; G06T 13/80; G06T 19/00
See application file for complete search history.

(56) References Cited

U.S. PATENT DOCUMENTS

| | | | | |
|---|---|---|---|---|
| 2007/0132765 A1* | 6/2007 | Lee | .......................... | G06T 13/40 345/473 |
| 2007/0200853 A1* | 8/2007 | Bruggeman | ......... | G11B 27/034 345/473 |
| 2008/0007567 A1* | 1/2008 | Clatworthy | ............. | G06T 15/00 345/619 |
| 2021/0304481 A1* | 9/2021 | Chandrasekaran | ..... | G06T 13/40 |
| 2021/0375022 A1* | 12/2021 | Lee | .......................... | G06T 19/00 |

* cited by examiner

*Primary Examiner* — Kee M Tung
*Assistant Examiner* — Khoa Vu
(74) *Attorney, Agent, or Firm* — Fernando & Partners, LLP

(57) ABSTRACT

In one implementation, a method of displaying an animation is performed by a device including a display, one or more processors, and non-transitory memory. The method includes executing a 2D animation system process, executing a 3D animation system process, and executing a 3D animation application process including a 3D animation definition defining an animation changing a target property of a 2D layer of an entity from a first value at a first time to a second value at a second time. Executing the 3D animation application process includes generating a 2D animation definition defining the animation, providing the 2D animation definition to the 2D animation system process for generating 2D display data, and providing the 3D animation definition to the 3D animation system process for generating 3D display data. The method further includes displaying the animation on the display based on the 2D display data and the 3D display data.

19 Claims, 11 Drawing Sheets

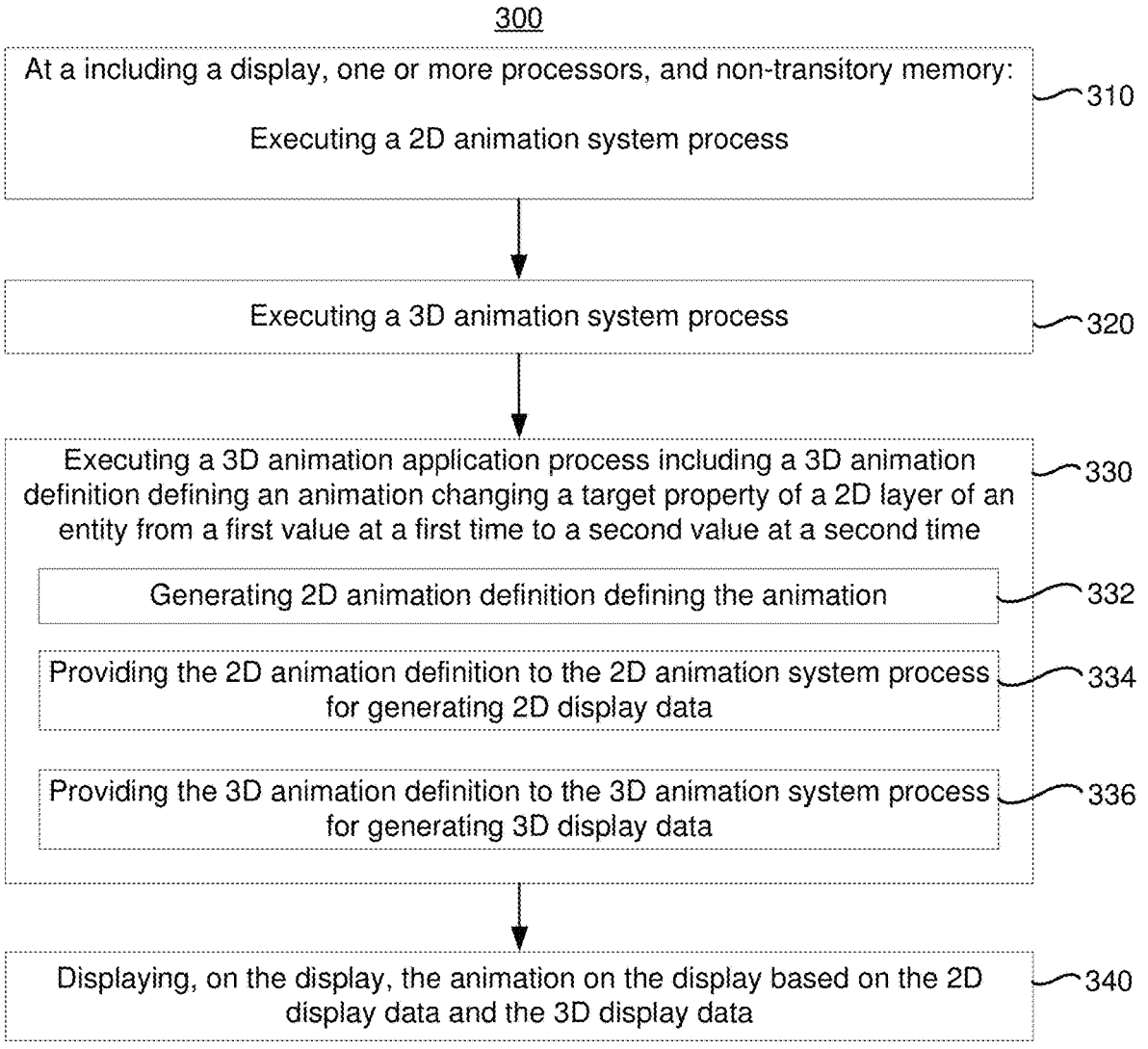

300

At a including a display, one or more processors, and non-transitory memory:

Executing a 2D animation system process        ⌐310

Executing a 3D animation system process        ⌐320

Executing a 3D animation application process including a 3D animation        ⌐330
definition defining an animation changing a target property of a 2D layer of an
entity from a first value at a first time to a second value at a second time Generating 2D animation definition defining the animation        ⌐332

Providing the 2D animation definition to the 2D animation system process        ⌐334
for generating 2D display data Providing the 3D animation definition to the 3D animation system process        ⌐336
for generating 3D display data Displaying, on the display, the animation on the display based on the 2D        ⌐340
display data and the 3D display data

Figure 3

UNIFIED ANIMATION API

CROSS-REFERENCE TO RELATED APPLICATIONS

This application claims priority to U.S. Provisional Patent App. No. 63/246,645, filed on Sep. 21, 2021, which is hereby incorporated by reference in its entirety.

TECHNICAL FIELD

The present disclosure generally relates to systems, methods, and devices for implementing a unified animation application programming interface (API) for both 3D entities and 2D layers thereof.

BACKGROUND

In various implementations, a two-dimensional (2D) animation API is defined for composing, rendering, and animating 2D layers, such as user interface (UI) elements of a graphical user interface (GUI). Further, in various implementations, a three-dimensional (3D) animation API is defined for simulating, rendering, and animating 3D entities in a 3D environment. However, animating 2D layers of 3D entities according to the 3D animation API requires extensive expansion of the 3D animation API.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of displaying an animation in accordance with some implementations.

Figure 1:
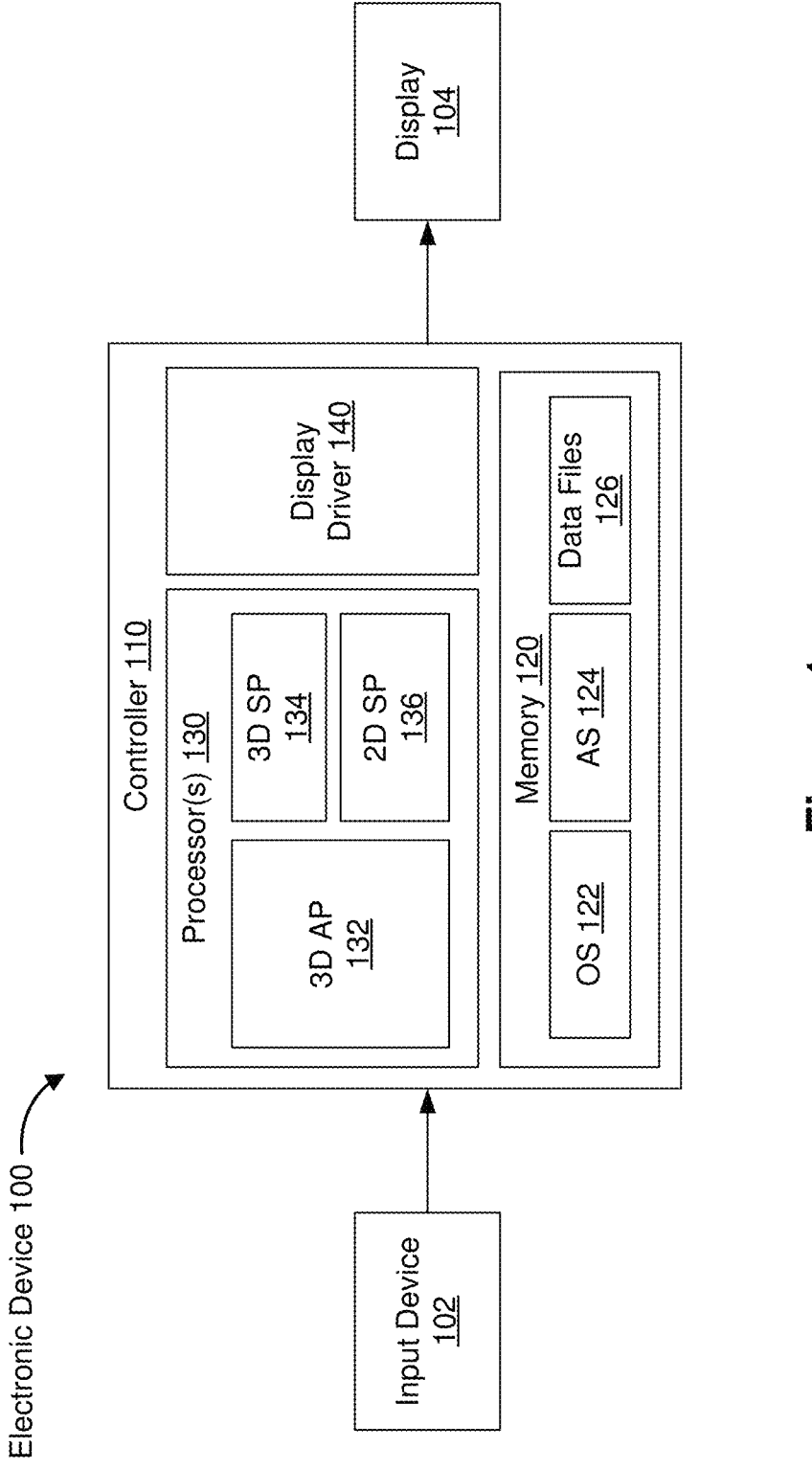
FIG. 1 is a block diagram of an example electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying an animation. In various implementations, the method is performed by a device including a display, one or more processors, and non-transitory memory. The method includes executing a 2D animation system process, executing a 3D animation system process, and executing a 3D animation application process including a 3D animation definition defining an animation changing a target property of a 2D layer of an entity from a first value at a first time to a second value at a second time. Executing the 3D animation application process includes generating a 2D animation definition defining the animation, providing the 2D animation definition to the 2D animation system process for generating 2D display data, and providing the 3D animation definition to the 3D animation system process for generating 3D display data. The method further includes displaying the animation on the display based on the 2D display data and the 3D display data.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in various implementations, a 2D animation API is defined for composing, rendering, and animating 2D layers and a 3D animation API is defined for simulating, rendering, and animating 3D entities in a 3D environment. However, animating 2D layers of 3D entities according to the 3D animation API requires extensive expansion of the 3D animation API. In various implementations, the 3D animation API leverages the already-defined 2D animation API to form a unified animation API.

An electronic device 100 includes a controller 110 coupled to an input device 102 and a display 104. The controller 110 includes memory 120 which stores an operating system 122, application software 124, and data files 126. The controller 110 includes one or more processors 130 which, in conjunction with the memory 120, execute the operating system 122 as one or more system processes and executes the application software 124 as one or more application processes.

In various implementations, the operating system 122 includes a three-dimensional (3D) animation program that exposes an 3D animation application programming interface (API). The 3D animation API provides a framework for simulating, rendering, and animating 3D objects in a 3D environment. In various implementations, the operating system 122 includes a two-dimensional (2D) animation program that exposes a 2D animation API. The 2D animation API provides a framework for composing, rendering, and animating 2D layers, such as user interface (UI) elements of a graphical user interface (GUI).

In various implementations, the application software 124 includes a 3D animation application programmed according to the 3D animation API. In various implementations, the 3D animation application is programmed by a programmer using a 3D animation programming user interface that implements the 3D animation API.

In various implementations, the one or more processors 130 execute the 3D animation program of the operating system 122 as a 3D animation system process 134 and the one or more processors 130 execute the 2D animation program of the operating system 122 as a 2D animation process 136. In various implementations, the one or more processors 130 execute the 3D animation application of the application software 124 as a 3D animation application process 132.

Based on inputs from the 3D application process 132, system processes, such as the 2D animation system process and the 3D animation system process, generate display data which is provided to a display driver 140. The display driver 140 drives the display 104 to display images based on the display data.

In various implementations, the 3D animation application defines a display-locked 2D layer according to the 3D animation API. For example, in various implementations, the 3D animation application defines a display-locked clock. In various implementations, the 3D animation application defines a world-locked 2D layer in a 3D environment according to the 3D animation API. For example, in various implementations, the 3D animation application defines a tile of a virtual web browser. In various implementations, the 3D animation application defines a 2D layer of a 3D object in the 3D environment. For example, in various implementations, the 3D animation application defines a virtual laptop including a 2D layer on a virtual screen of the virtual laptop.

In various implementations, a programmer implementing the 3D animation API can leverage the 2D animation API to animate a 2D layer of an entity defined according to the 3D animation API by calling the 2D animation API.

In various implementations, the 3D animation application includes a 3D animation definition, defined according to the 3D animation API, defining an animation changing a target property of a 2D layer of an entity, defined according to the 3D animation API, from a first value at a first time to a second value at a second time. In various implementations, the first time is defined as a time at which a trigger is detected and the second time is defined as an amount of time after the first time.

To execute the animation, the 3D application process 132 generates a 2D animation definition, defined according to the 2D animation API, defining the animation. In various implementations, prior to generating the 2D animation definition, the 3D application process 132 validates the 3D animation definition as targeting a valid property of the 2D layer with a valid type for that property (float, color, vector, etc.). The 2D animation API defines a plurality of properties for 2D layers along with the respective type (or types) for those properties.

The 3D application process 132 links the 2D animation definition to the 3D animation definition and adds the 2D animation definition to the 2D layer of the entity. The 3D application process 132 serializes the 3D animation definition and the 2D animation definition and sends them to the system processes. In particular, the 3D animation definition is provided to the 3D animation system process 134 and the 2D animation definition is provided to the 2D animation system process 136.

Once per frame of the animation, the 3D animation system process 134 updates all executing animations, including the animation associated with both the 3D animation definition and the 2D animation definition. In particular, the 3D animation system process 134 determines a value of the target property based on the 3D animation definition.

Later in the frame, the 2D animation system process 136 updates all executing 2D animations, including the animation associated with both the 3D animation definition and the 2D animation definition. The 2D animation definition includes an "external" indication that indicates that the 2D animation system process 136 is to retrieve the value of the target property from the 3D animation system process 136. Thus, rather than determining the value of the target property itself, the 2D animation system process 136 determines a value of the target property by, as indicated by the 2D animation definition, retrieving the value from the 3D animation system process 134.

In various implementations, rather than retrieving the value of the target property from the 3D animation system process 134, the 2D animation system process 136 retrieves the value from the 3D animation application process 132.

Based on the value retrieved from the 3D animation system process 134 (or the 3D animation application process 132), the 2D animation system process 136 generates 2D display data. The 2D display data, and other display data from other system processes, is used (e.g., by an aggregation system process) to generate final display data which is provided to the display driver 140. The display driver 140 drives the display 104 to display an image based on the final display data.

As this occurs during multiple frame periods, the 2D animation system process 136 retrieves, from the 3D animation system process 134 or the 3D animation application process 132, a plurality of values for the target property at a respective plurality of times between the first time and the second time and generates 2D display data based on the plurality of values. The electronic device 100 displays, on the display based on the 2D display data, the animation. For example, in various implementations, an aggregation system process generates, based on the 2D display data and other display data, final display data which is displayed by the display 104.

In various implementations, the 3D animation application process 132 generates queries regarding the state of the animation. To respond to such queries, the state of the animation is extracted from a presentation layer, defined by the 2D animation API, of the 2D layer and returned to the 3D animation application process 132 according to the 3D animation API.

In various implementations, the 3D animation application process 132 can cancel the animation within the 2D animation system process 136 and receive completion notifications according to the 3D animation API.

Because the values of the target property are provided by the 3D animation system process 134 or the 3D animation application process 132, the timing of the animation is controlled in conjunction with other 2D animations and/or 3D animations. Thus, the animation of the 2D layer can be synchronized with other animations or paused by the 3D animation system process 134 or the 3D animation application process 132.

FIGS. 2A-2I illustrate an XR environment 200 displayed, at least in part, by a display of an electronic device. The XR environment 200 is based on a physical environment of a living room in which the electronic device is present. FIGS. 2A-2I illustrate the XR environment 200 during a series of time periods. In various implementations, each time period is an instant, a fraction of a second, a few seconds, a few hours, a few days, or any length of time.

The XR environment 200 includes a plurality of objects, including one or more physical objects (e.g., a wall 211 and a table 212) of the physical environment and one or more virtual objects (e.g., a virtual clock 221, a virtual window 222, a virtual laptop 223 including a virtual screen 224, and a virtual lamp 225 that emits virtual light 226). In various implementations, certain objects (such as the physical objects, e.g., the wall 211 and the table 212, and certain virtual objects, e.g., the virtual window 222, the virtual laptop 223, and the virtual lamp 225) are displayed at a location in the XR environment 200, e.g., at a location defined by three coordinates in a three-dimensional (3D) XR coordinate system. Accordingly, when the electronic device moves in the XR environment 200 (e.g., changes either position and/or orientation), the objects are moved on the display of the electronic device, but retain their location in the XR environment 200. Such virtual objects that, in response to motion of the electronic device, move on the display, but retain their position in the XR environment are referred to as world-locked objects. In various implementations, certain virtual objects (such as the virtual clock 221) are displayed at locations on the display such that when the electronic device moves in the XR environment 200, the objects are stationary on the display on the electronic device. Such virtual objects that, in response to motion of the electronic device, retain their location on the display are referred to as head-locked objects or display-locked objects.

Figure 2A:
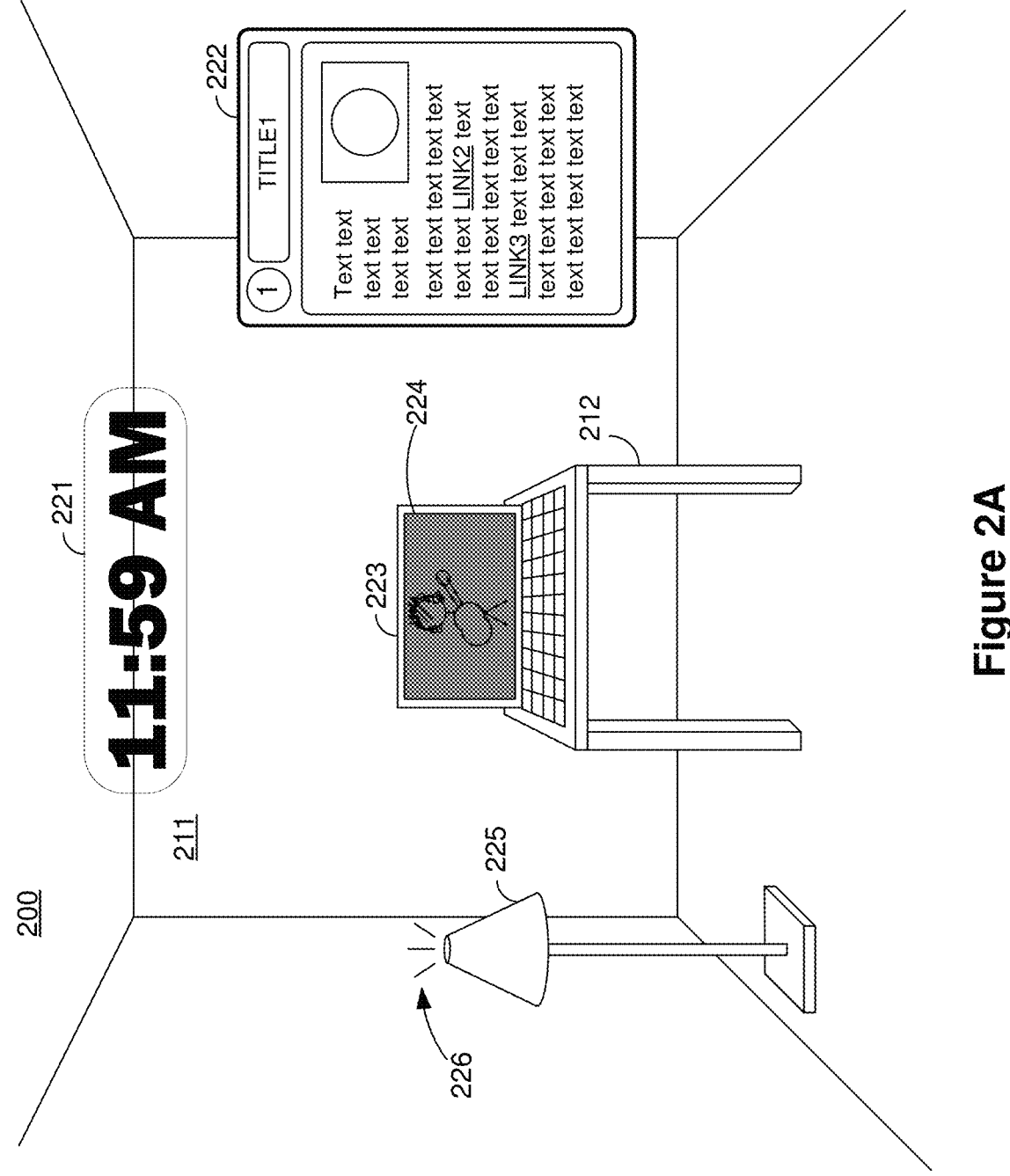
FIGS. 2A-2I illustrate an XR environment during a series of time periods in accordance with some implementations.

FIG. 2A illustrates the XR environment 200 during a first time period. During the first time period, the electronic device displays the virtual clock 221 with a first transparency and a first background color. During the first time period, the electronic device displays the virtual window 222 including, at the top of the virtual window 222, a first icon and a first title (labeled "TITLE1"). The virtual window 222 further includes content including an image and text. The text includes a link to second content (labeled "LINK2") and a link to third content (labeled "LINK3"). In various implementations, the content is a first webpage, the link to the second content is a link to a second webpage, and the link to the third content is a link to a third webpage. Thus, in various implementations, the virtual window 222 is a content pane of a web browser. During the first time period, the electronic device displays the virtual laptop 223 including the virtual screen 224 displaying content (e.g., a music video) with a first brightness. During the first time period, the electronic device displays the virtual lamp 225 emitting virtual light 226 at a first intensity.

Figure 2B:
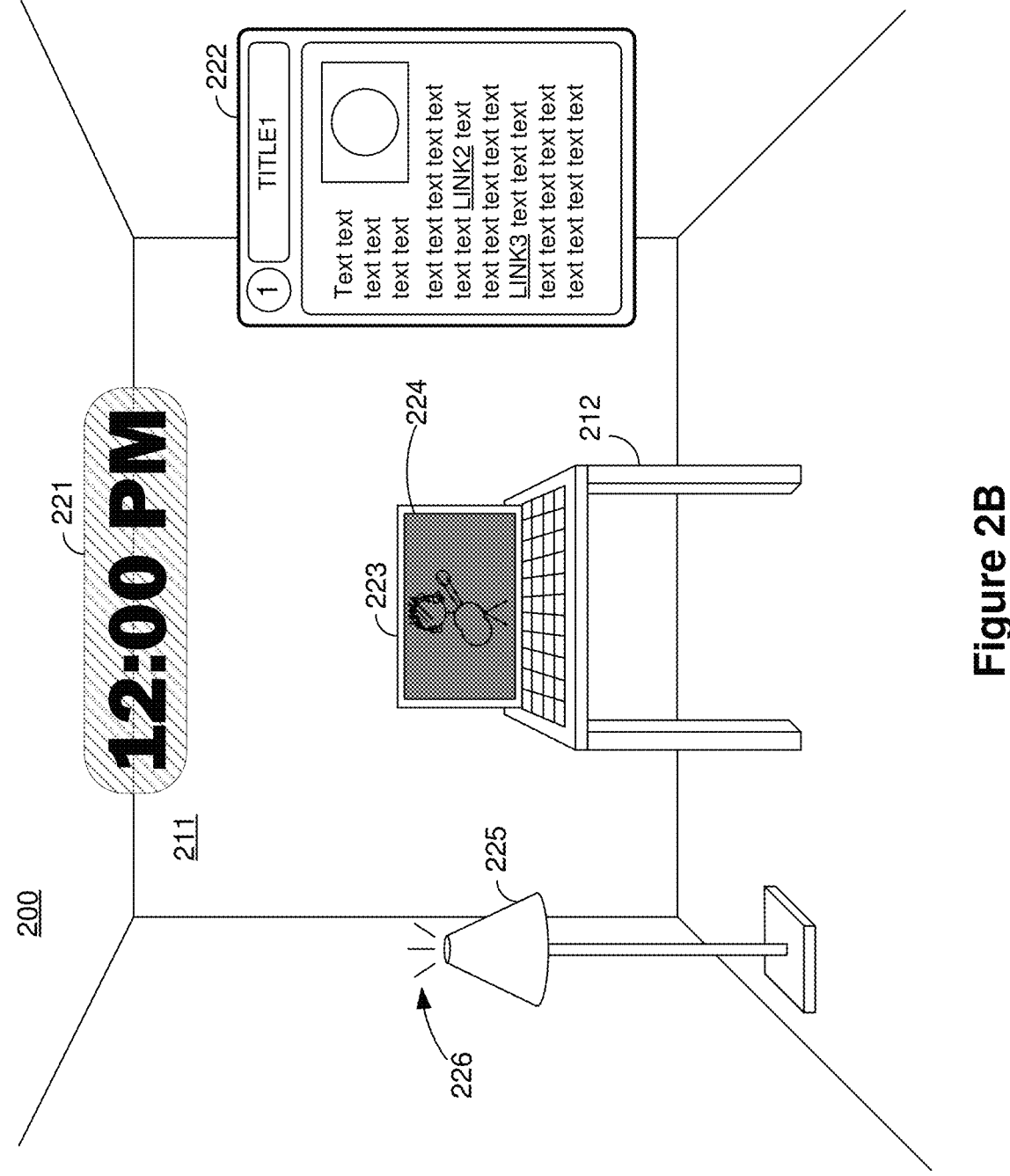

FIG. 2B illustrates the XR environment 200 during a second time period subsequent to the first time period. During the second time period, in response to a trigger (e.g., the time being 12:00 PM), the electronic device animates the virtual clock 221 to transition back and forth between the first transparency with the first background color and a second transparency with a second background color. Thus, during the second time period, the virtual clock 221 is displayed with an intermediate transparency between the first transparency and the second transparency and with an intermediate background color between the first background color and the second background color.

Figure 2C:
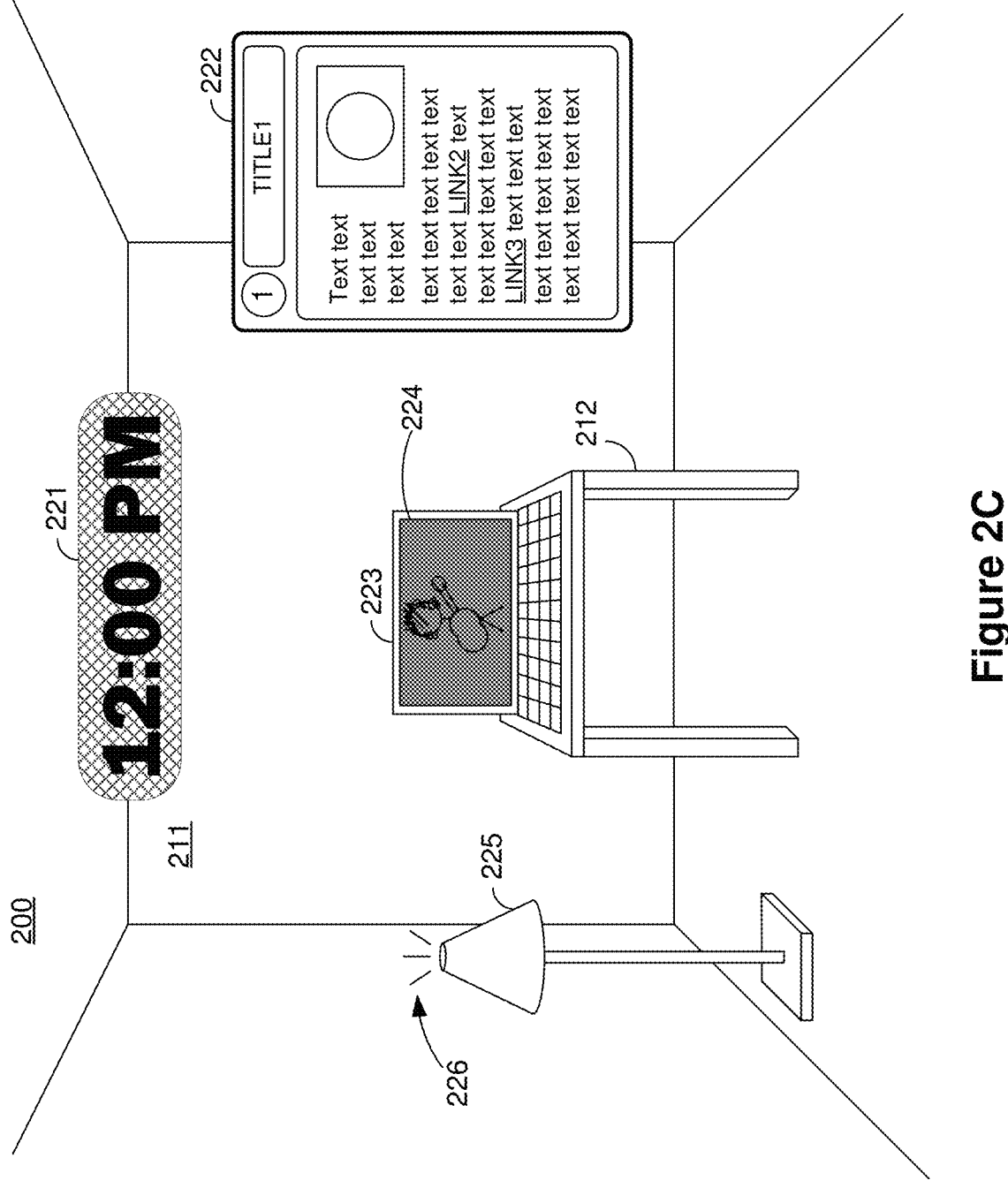

FIG. 2C illustrates the XR environment 200 during a third time period subsequent to the second time period. During the third time period, the virtual clock 221 is displayed with the second transparency and the second background color.

Figure 2D:
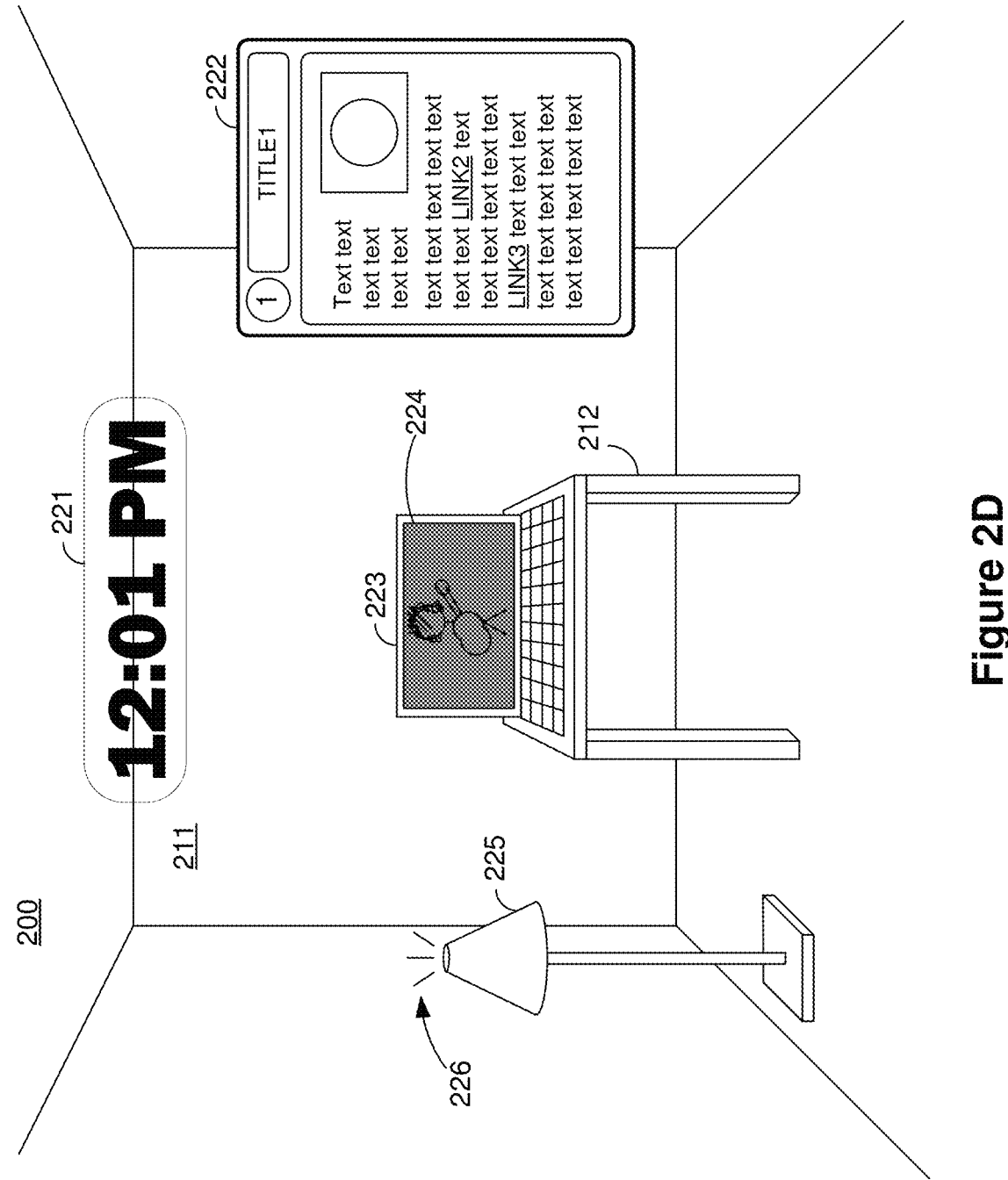

FIG. 2D illustrates the XR environment 200 during a fourth time period subsequent to the third time period. After transitioning repeatedly between the first transparency with the first background color to the second transparency with the second background color, the animation ceases. Thus, during the fourth time period, the virtual clock 221 is displayed with the first transparency and the first background color.

To achieve this effect, in various implementations, a programmer defines a clock entity according to a 3D animation API. The programmer further defines a 2D layer of the clock entity according to the 3D animation API. The 2D layer of the clock entity has a transparency property defined by the 2D animation API and a background color property defined by the 2D animation API. The programmer further defines a first animation, according to the 3D animation API, targeting the transparency property of the 2D layer of the clock entity and indicating a series of keyframe times and corresponding keyframe values for the transparency property, e.g., scalar values between 0 and 1 that indicate a transition from transparent to opaque and back again a number of times. The programmer further defines a second animation, according to the 3D animation API, targeting the background color property of the 2D layer of the clock entity and indicating the series of keyframe times and corresponding keyframe values for the background color, e.g., vector RGB values that indicate a transition from white to red and back again the number of times.

Because the values at any time of the transparency property and the background color property are provided, to a 2D animation system process, by a 3D animation system process or a 3D animation application process, the timing of both animations is controlled by a single process and can be synchronized.

Further, during the fourth time period, the virtual window 222 displays the content with the image having a first size.

Figure 2E:
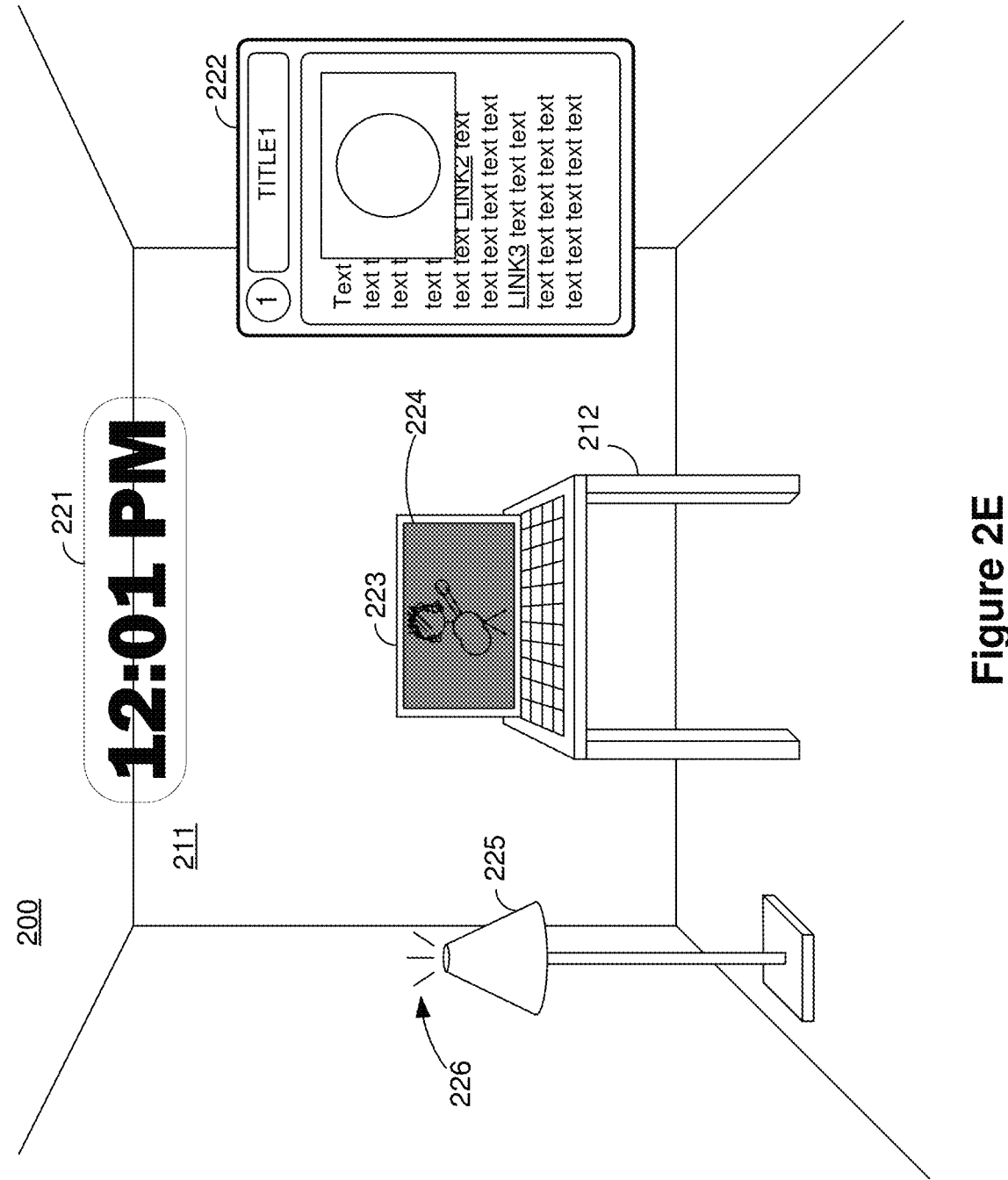

FIG. 2E illustrates the XR environment 200 during a fifth time period subsequent to the fourth time period. During the fifth time period, in response to a trigger (e.g., the user looking at the image), the electronic device animates the image within the content of the virtual window 222 to grow from the first size to a second size. Thus, during the fifth time period, the image within the content of the virtual window 222 is displayed with an intermediate size between the first size and the second size.

Figure 2F:
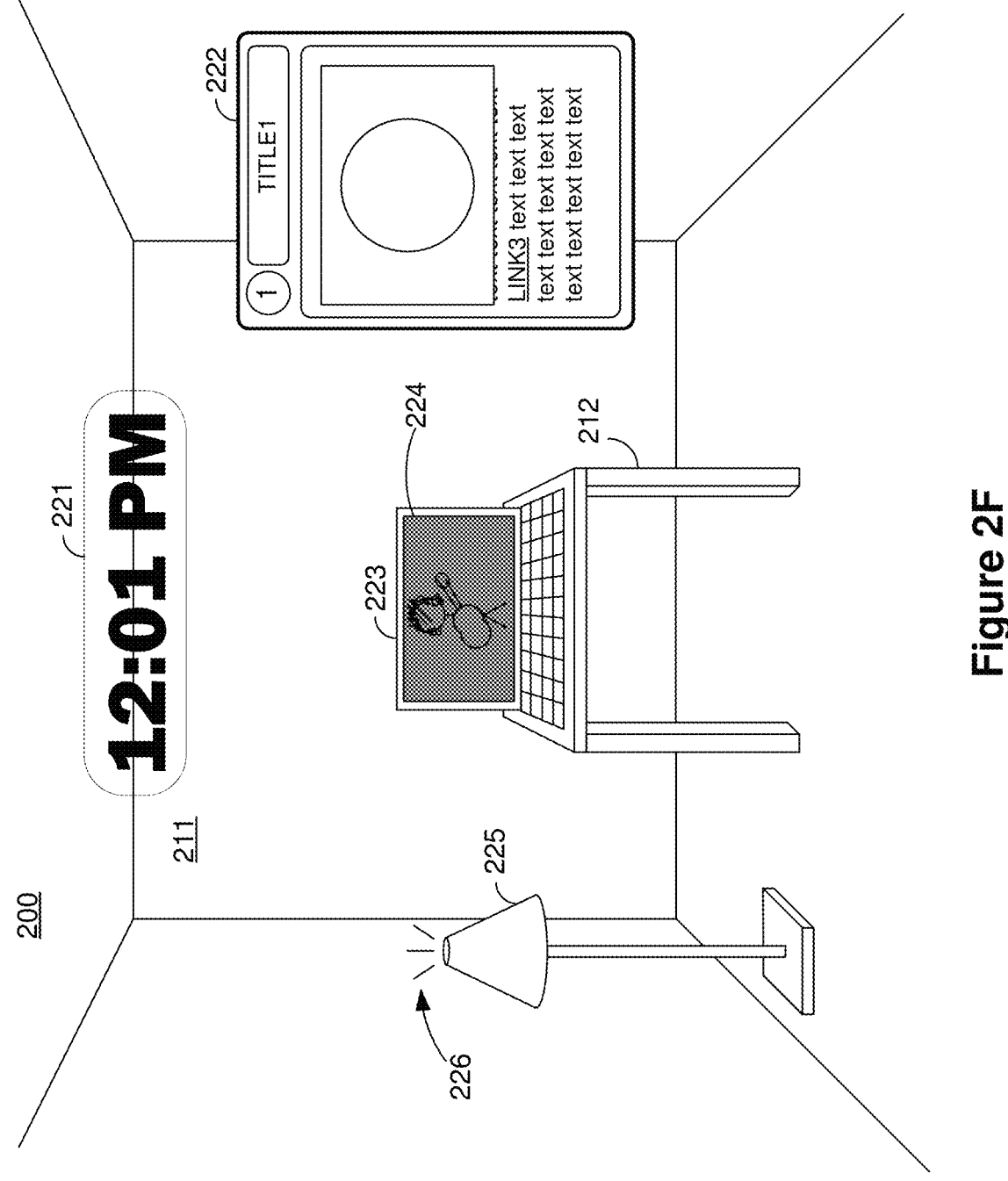

FIG. 2F illustrates the XR environment 200 during a sixth time period subsequent to the fifth time period. During the sixth time period, the image within the content of the virtual window 222 is displayed with the second size.

Figure 2G:
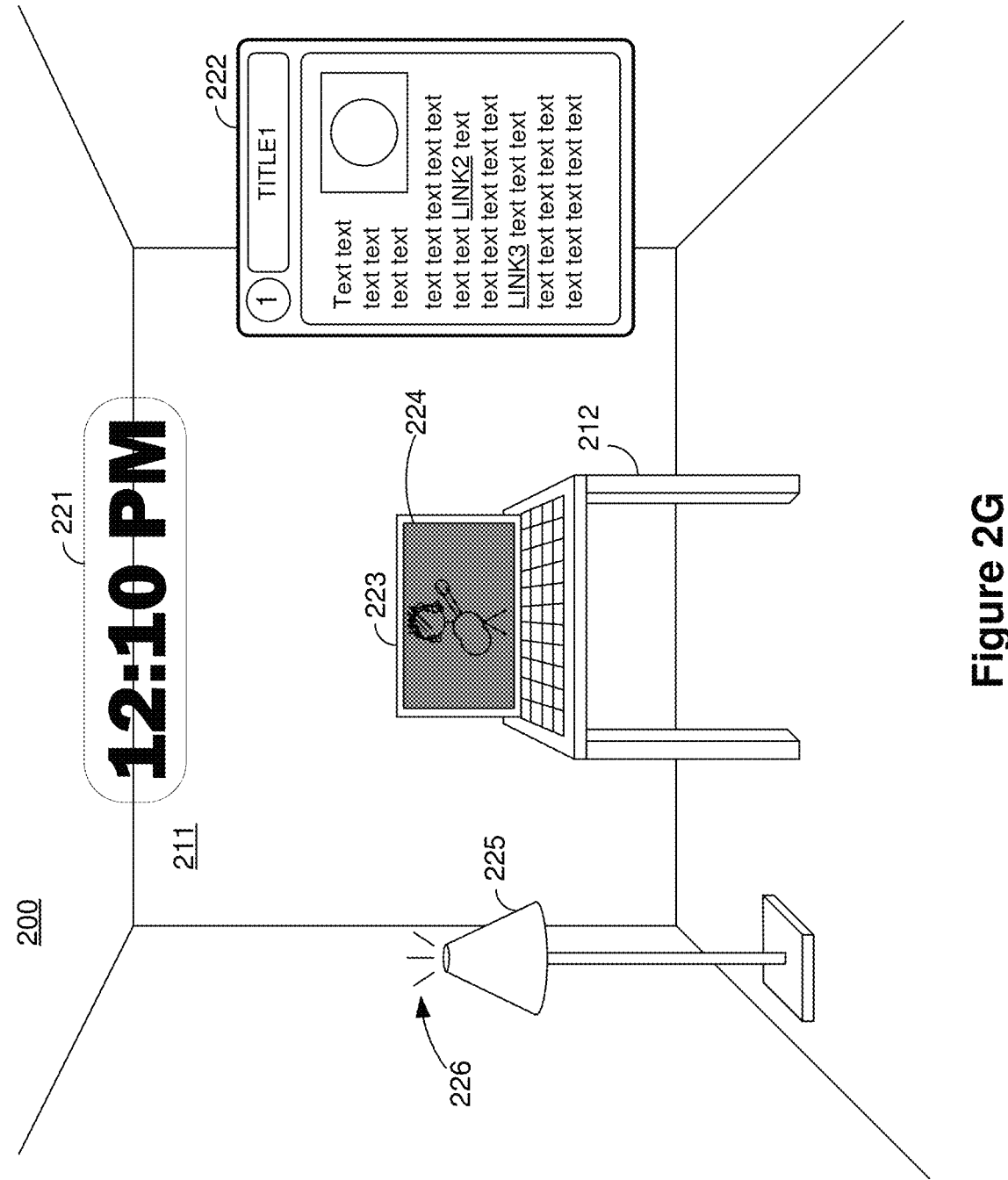

FIG. 2G illustrates the XR environment 200 during a seventh time period subsequent to the sixth time period. In response to a trigger (e.g., the user looking away from the image), the electronic device animates the image within the content of the virtual window 222 to shrink from the second size to a first size. Thus, during the seventh time period, the image within the content of the virtual window 222 is displayed with the first size.

To achieve this effect, in various implementations, a programmer defines a window entity according to the 3D animation API. The programmer further defines a 2D layer of the window entity according to the 3D animation API. The programmer further defines, for the image, a 2D sublayer of the 2D layer of the window entity. The 2D sublayer has a size property defined by the 2D animation API. The programmer further defines an animation, according to the 3D animation API, targeting the size property of the 2D sublayer of the 2D layer of the window entity and indicating the first size at a first time and the second size, larger than the first size, at a second time.

Further, during the seventh time period, the virtual screen 224 displays the content with a first brightness and the virtual light 226 is emitted with a first intensity.

Figure 2H:
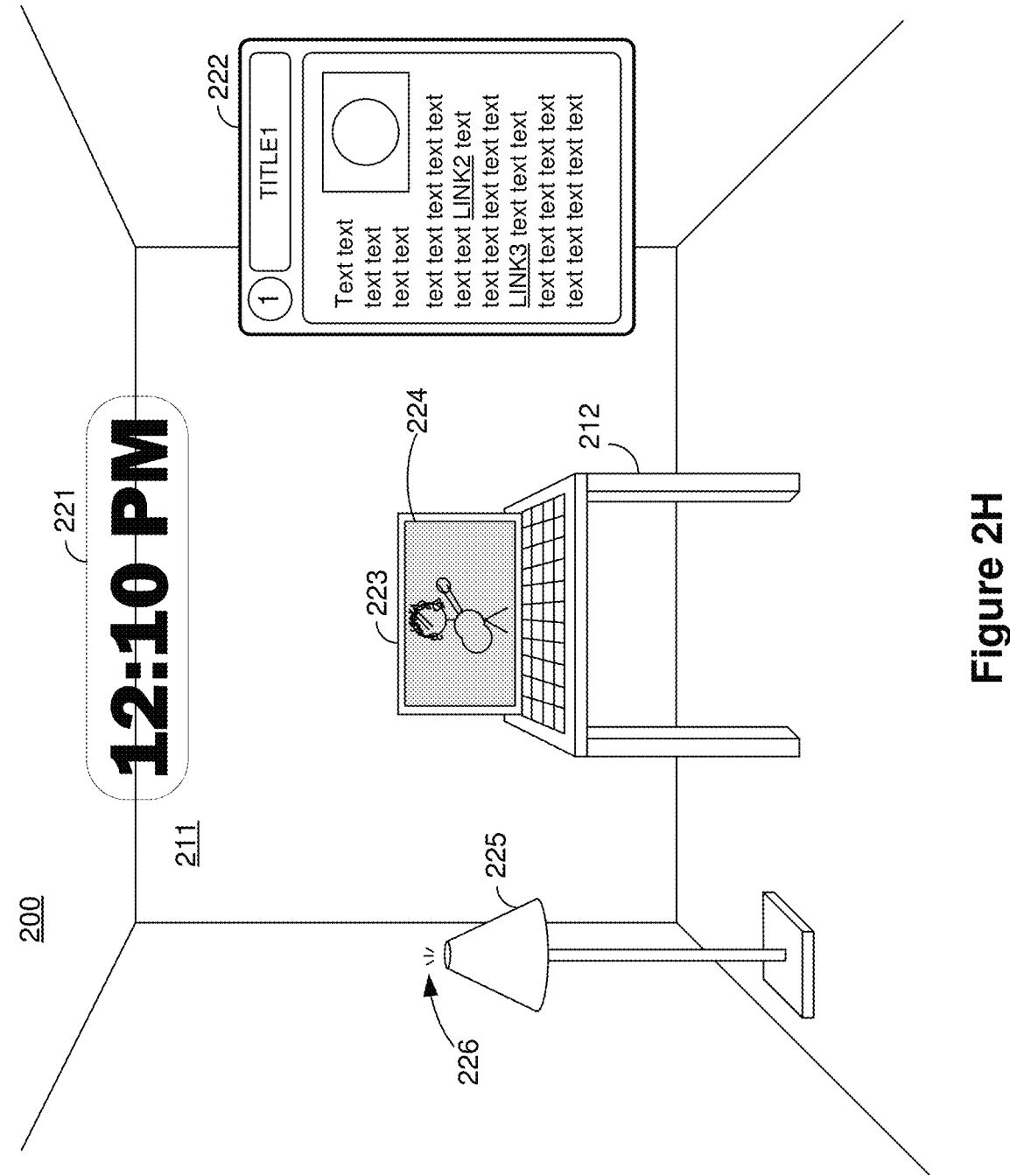

FIG. 2H illustrates the XR environment 200 during an eighth time period subsequent to the seventh time period. In response to a trigger (e.g., a user activating a "movie" mode), the electronic device animates the virtual laptop 223 such that the virtual screen 224 changes from the first brightness to a second brightness and simultaneously animates the virtual lamp 225 such that the virtual light 226 changes from a first intensity to a second intensity. Accordingly, during the eighth time period, the virtual screen 224 has an intermediate brightness between the first brightness and the second brightness and the virtual light 226 has an intermediate intensity between the first intensity and the second intensity.

Figure 2I:
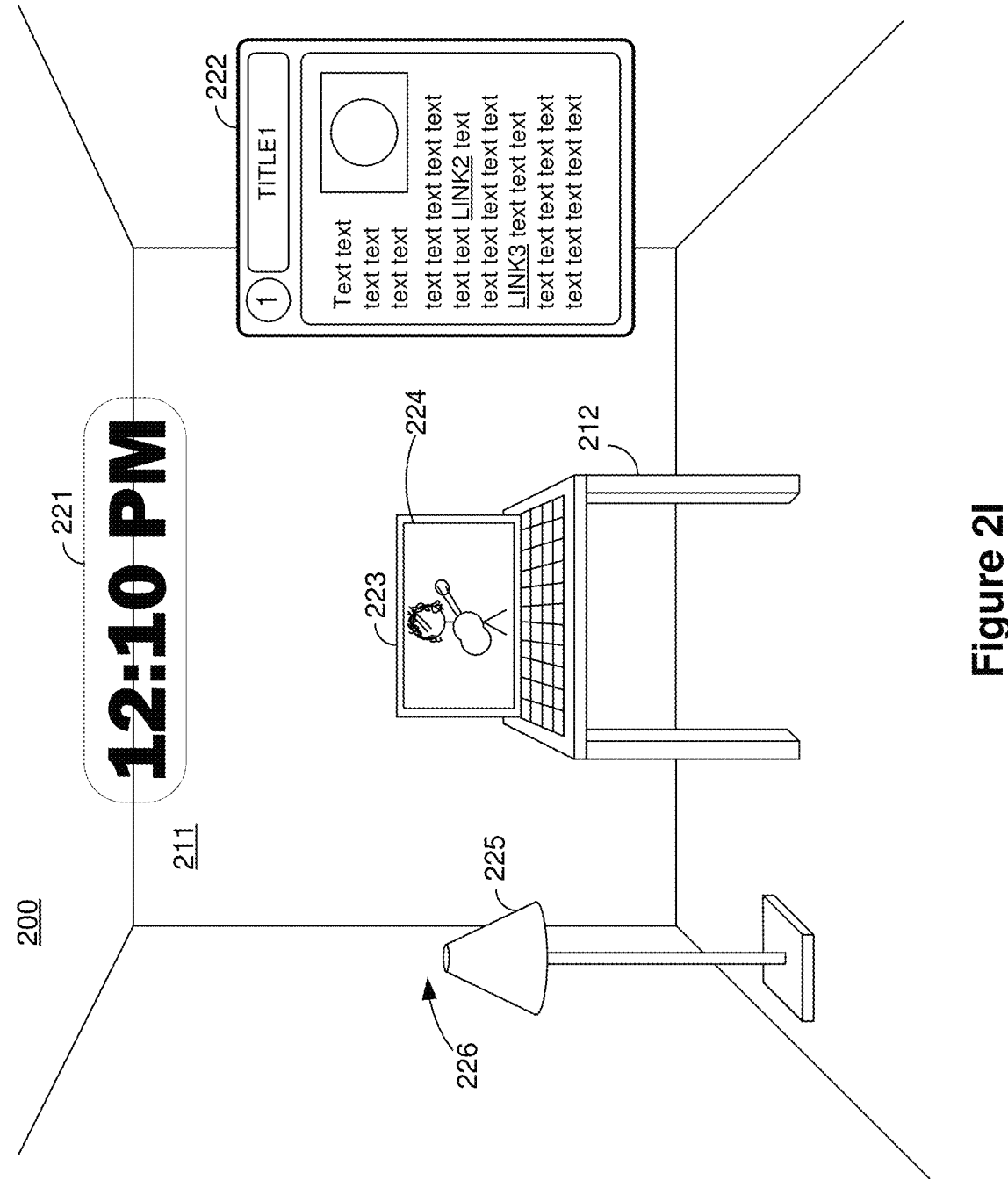

FIG. 2I illustrates the XR environment 200 during a ninth time period subsequent to the eighth time period. During the ninth time period, the virtual laptop 223 is displayed with the virtual screen 224 having the second brightness and the virtual lamp 225 is displayed emitting the virtual light 226 at the second intensity.

To achieve this effect, in various implementations, a programmer defines a laptop entity according to the 3D animation API. The programmer further defines, according to the 3D animation API and for the virtual screen 224, a 2D layer of the laptop entity. The 2D layer has a brightness property (or a background color property that can substitute for a brightness property) defined by the 2D animation API. The programmer defines a lamp entity according to the 3D animation API. The lamp entity has an intensity property defined by the 3D animation API.

The programmer further defines a first animation, according to the 3D animation API, targeting the brightness property of the 2D layer of the laptop entity and indicating the first brightness at the first time and the second brightness, brighter than the first brightness, at the second time. The programmer further defines a second animation, according to the 3D animation API, targeting the intensity property of the lamp entity and indicating the first intensity at the first time and the second intensity, less intense than the first intensity (e.g., off), at the second time.

Because the values at any time of the brightness property and the intensity property are provided, to a 2D animation system process, by a 3D animation system process or a 3D animation application process, the timing of both animations is controlled by a single process and can be synchronized.

FIG. 3 is a flowchart representation of a method of displaying an animation in accordance with some implementations. In various implementations, the method 300 is performed by a device with a display, one or more processors, and non-transitory memory (e.g., the electronic device 100 of FIG. 1). In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device executing a 2D animation system process. For example, in FIG. 1, the electronic device 100 executes the 2D animation program of the operating system 122 as the 2D animation system process 136.

The method 300 continues, in block 320, with the device executing a 3D animation system process. For example, in FIG. 1, the electronic device 100 executes the 3D animation program of the operating system 122 as the 3D animation system process 134.

The method 300 continues, in block 330, with the device executing a 3D animation application process. For example, in FIG. 1, the electronic device 100 executes the 3D animation application of the application software 123 as the 3D animation application process 132. The 3D animation application process includes a 3D animation definition defining an animation changing a target property of a 2D layer of an entity from a first value at a first time to a second value at a second time.

In various implementations, the 2D layer is a world-locked 2D layer. For example, in FIGS. 2D-2F, the device animates the virtual window 222 such that the image changes from a first size at a first time to a second size at a second time. In various implementations, the 2D layer is a 2D layer of a 3D object. For example, in FIGS. 2G-2I, the device animates the virtual screen 224 of the virtual laptop 223 such that the virtual screen 224 changes from a first brightness at a first time to a second brightness at a second time. In various implementations, the 2D layer is a display-locked 2D layer. For example, in FIGS. 2B-2D, the device animates the virtual clock 221 between a first time and a second time back and forth between a first transparency with a first background color and a second transparency with a second background color.

In various implementations, the first time corresponds to a time at which a trigger is detected and the second time corresponds to an amount of time after the first time. For example, in FIG. 2D, the first time corresponds to a time at which a user first looks at the image. As another example, in FIG. 2G, the first time corresponds to a time in which a user activates a "movie" mode. In various implementations, the first time corresponds to a fixed time. For example, in FIG. 2B, the first time corresponds to 12:00 PM.

Executing the 3D animation application process, in block 330, includes, in block 332, the device generating a 2D animation definition defining the animation. In various implementations, the 3D animation definition defines the animation according to a 3D animation API and the 2D animation definition defines the animation according to a 2D animation API. Although referred to as a 3D animation definition, it is to be appreciated that the animation may not, in some circumstances, animate an entity in three dimensions. In various implementations, generating the 2D animation definition includes validating the 3D animation definition including determining that the target property of the 2D layer is defined according to a 2D animation API and generating the 2D animation definition in response to validating the 3D animation definition.

Executing the 3D animation application process, in block 332, further includes, in block 334, providing the 2D animation definition to the 2D animation system process for generating 2D display data and, in block 336, providing the 3D animation definition to the 3D animation system process for generating 3D display data. Accordingly, in various implementations, executing the 2D animation system process includes generating the 2D display data and executing the 3D animation system process includes generating the 3D display data.

In various implementations, executing the 2D animation system process, in block 310, includes retrieving, from the 3D animation application process or the 3D animation system process, a plurality of values for the target property at a respective plurality of times between the first time and the second time. Thus, in various implementations, the 2D animation system process does not generate the plurality of values itself, but retrieves the values from the 3D animation application process or the 3D animation system process.

In various implementations, executing the 2D animation system process further includes generating 2D display data based on the plurality of values. In various implementations, the 2D display data is generated according to a 2D animation API.

The method 300 continues, in block 340, with the device displaying the animation on the display based on the 2D display data and the 3D display data. In various implementations, the device aggregates or combines the 2D display data and the 3D display data with other display data to generate final display data and displays the animation based on the final display data.

In various implementations, the 3D animation application process includes a second 3D animation definition defining an animation changing a second target property and the method 300 further includes displaying, on the display, the second animation synchronized with the animation. In various implementations, the second target property is a property of a 2D object. For example, in FIGS. 2B-2D, the device animates the virtual clock 221 changing from a first transparency to a second transparency simultaneously with changing from a first background color to a second background color. In various implementations, the second target property is a property of a 3D object. For example, in FIGS. 2G-2I, the device animates the virtual screen 224 changing from a first brightness to a second brightness simultaneously with changing the virtual lamp 225 to emit the virtual light 226 from a first intensity to a second intensity.

In various implementations, executing the 3D animation application process, in block 330, further includes generating a query regarding a state of the animation and executing the 2D animation system process, in block 310, further includes, in response to the query, extracting the state of the animation from a presentation layer, defined by a 2D animation API, of the 2D layer.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device having a display, one or more processors, and non-transitory memory:

executing, by an operating system, a three-dimensional (3D) animation system process that animates 3D entities in a 3D environment, wherein at least one 3D entity includes a two-dimensional (2D) layer;

executing, by the operating system, a 2D animation system process;

executing a 3D animation application process separate from the operating system and including a 3D animation definition defining 3D animations for 3D entities in the 3D environment and a 2D animation, wherein executing the 3D animation application process includes:

with the 3D animation system process, animating the 3D entities;

with the 3D animation system process, providing parameters of the 2D layer to the 2D animation system process, the parameters comprising a plurality of values for a target property of the 2D layer at a respective plurality of times between a first time and a second time;

with the 2D animation system process, animating the 2D layer based on the parameters provided by the 3D animation system process to generate a 2D animation definition defining the 2D animation; and displaying, on the display, the animation.

2. The method of claim 1, wherein the 2D layer is a world-locked 2D layer.

3. The method of claim 1, wherein the 2D layer is a 2D layer of a 3D entity object.

4. The method of claim 1, wherein the 2D layer is a display-locked 2D layer.

5. The method of claim 1, wherein the 3D animation definition defines the animation according to a 3D animation application programming interface (API) of the 3D animation system process and the 2D animation definition defines the animation according to a 2D animation API of the 2D animation system process.

6. The method of claim 1, wherein generating the 2D animation definition includes validating the 3D animation definition including determining that the target property of the 2D layer is defined according to a 2D animation API of the 2D animation system process.

7. The method of claim 1, wherein the first time corresponds to a time at which a trigger is detected and the second time corresponds to an amount of time after the first time.

8. The method of claim 1, wherein generating the animation includes aggregating the 2D display data with other display data to generate final display data.

9. The method of claim 1, wherein the 3D animation application process includes a second 3D animation definition defining a second animation changing a second target property, further comprising displaying, on the display, the second animation synchronized with the animation.

10. The method of claim 9, wherein the second target property is a property of a 2D layer.

11. The method of claim 9, wherein the second target property is a property of a 3D entity.

12. The method of claim 1, wherein executing the 3D animation application process further includes generating a query regarding a state of the animation and wherein executing the 2D animation system process further includes, in response to the query, extracting the state of the animation from a presentation layer, defined by a 2D animation API of the 2D animation system process, of the 2D layer.

13. The method of claim 1, wherein the 2D layer of the entity is a user interface (UI) element of a graphical user interface (GUI).

14. The method of claim 1, wherein the 2D animation definition indicates that the 2D animation system process is to retrieve the plurality of values for the target property from the 3D animation system process.

15. A device comprising:

a display;

a non-transitory memory; and one or more processors to:

execute, by an operating system, a 3D rendering system process that animates 3D entities in a 3D environment, wherein at least one 3D entity includes a two-dimensional (2D) layer;

execute, by the operating system, a 2D rendering system process;

execute a 3D rendering application process separate from the operating system and including a 3D animation definition defining 3D animations for 3D entities in the 3D environment and a 2D animation, wherein the one or more processors are to execute the 3D rendering application process by:

with the 3D rendering system process, animating the 3D entities;

with the 3D rendering system process, providing parameters of the 2D layer to the 2D rendering system process, the parameters comprising a plurality of layers for a target property of the 2D layer at a respective plurality of times between a first time and a second time;

with the 2D rendering system process, animating the 2D layer based on the parameters provided by the 3D rendering system process to generate a 2D animation definition defining the 2D animation; and display, on the display, the animation.

16. The device of claim 15, wherein the 3D animation definition defines the animation according to a 3D animation application programming interface (API) of the 3D rendering system process and the 2D animation definition defines the animation according to a 2D animation API of the 2D rendering system process.

17. The device of claim 15, wherein generating the animation includes aggregating the 2D display data with other display data to generate final display data.

18. The device of claim 15, wherein the one or more processors separately execute the 2D rendering system process, the 3D rendering system process, and the 3D rendering application process.

19. A non-transitory memory storing one or more programs, which, when executed by one or more processors of a device with a display, cause the device to:

execute, by an operating system, a three-dimensional (3D) rendering system process that animates 3D entities in a 3D environment, wherein at least one 3D entity includes a two-dimensional (2D) layer;

execute, by the operating system, a 2D rendering system process;

execute a 3D rendering process separate from the operating system and including a 3D animation, definition defining 3D animations for 3D entities in the 3D environment and a 2D animation, wherein the one or more processors are to execute the 3D rendering process by:

with the 3D rendering system process, animating the 3D entities;

with the 3D rendering system process, providing parameters of the 2D layer to the 2D rendering system process, the parameters comprising a plurality of values for a target property of the 2D layer at a respective plurality of times between a first time and a second time;

with the 2D rendering system process, animating the 2D layer based on the parameters provided by the 3D rendering system process to generate a 2D animation definition defining the 2D animation; and display, on the display, the animation.

* * * * *